US005462401A

United States Patent [19]
Brizzi et al.

[11] Patent Number: 5,462,401
[45] Date of Patent: Oct. 31, 1995

[54] METHOD OF SEPARATING TWO ROWS OF CIGARETTE PACKETS

[75] Inventors: Marco Brizzi, Zola Predosa; Antonio Gamberini, Bologna, both of Italy

[73] Assignee: G. D Societa' Per Azioni, Bologna, Italy

[21] Appl. No.: 66,861

[22] Filed: May 25, 1993

[30] Foreign Application Priority Data

May 26, 1992 [IT] Italy ................. BO92A0210

[51] Int. Cl.$^6$ ................................................ B65G 59/02
[52] U.S. Cl. .................. 414/797; 414/796.2; 414/786; 198/418.4
[58] Field of Search .................... 414/786, 796, 414/796.2, 797, 796.6; 198/418.4

[56] References Cited

U.S. PATENT DOCUMENTS 3,209,924 10/1965 Hawkes ........................ 414/796
3,669,283 6/1972 Brown, Jr. .................... 414/796
4,235,329 11/1980 Crawford et al. ............. 198/418.4
4,986,409 1/1991 Alexander et al. ............ 198/418.4
5,102,292 4/1992 Brinker et al. ................ 414/796
5,216,870 6/1993 Boriani et al. ................. 53/448
5,261,667 11/1993 Breeding ....................... 414/796

Primary Examiner—Michael S. Huppert
Assistant Examiner—Gregory A. Morse
Attorney, Agent, or Firm—Marshall, O'Toole, Gerstein, Murray & Borun

[57] ABSTRACT

A method of separating two superimposed rows of cigarette packets originally in direct contact with each other, whereby the two superimposed rows are fed into the input station of a separating device in a first direction parallel to the longitudinal axis of the rows; and are fed in a second direction, perpendicular to the first direction, to a separating station where they are separated by raising the top row and subsequently inserting, between the separated rows, a separating plate which is maintained between the rows as these are removed from the separating station in a third direction parallel to the first.

7 Claims, 5 Drawing Sheets

Fig. 5 ered by an input conveyor 11. Conveyor 11 presents a transportation surface coplanar with plates 9, and provides for feeding a succession of groups 2 to station 10 in a direction 12 aligned with plates 9 and with rows 4 and 5 and perpendicular to the longer longitudinal axis of packets 3 in rows 4 and 5.

METHOD OF SEPARATING TWO ROWS OF CIGARETTE PACKETS

BACKGROUND OF THE INVENTION

The present invention relates to a method of separating two rows of cigarette packets.

The present invention is especially suitable for use on a cartoning machine of the type described in Italian Patent Application N. BO91A 000253, wherein the packets are fed to the cartoning machine in successive groups, each comprising an even number of packets arranged in two superimposed, substantially horizontal rows contacting each other, and wherein each row is fed into a respective wrapping to form a respective half carton connected in detachable manner to the other half carton.

For producing cartons comprising two substantially separate half cartons, according to the above Italian Patent Application N. BO91A 000253, the two rows in each group are fed simultaneously to the wrapping unit and respectively over and beneath a separating plate whereby the two rows, originally contacting each other, are maintained a given distance apart.

SUMMARY OF THE INVENTION

It is an object of the present invention to provide a straightforward, low-cost method of separating two superimposed, mutually contacting rows of packets, and which, in particular, provides for safeguarding the packets against damage.

In particular, it is an object of the present invention to provide a method suitable for use on a cartoning machine of the aforementioned type, and which provides for separating the two rows in each group for enabling insertion between the rows of said separating plate.

According to the present invention, there is provided a method of separating two superimposed rows of cigarette packets originally in direct contact with each other, said rows presenting respective longitudinal axes; characterized by the fact that it comprises stages consisting in feeding the two superimposed rows to a separating device in a first direction parallel to said longitudinal axes; transversely separating the two rows by moving, inside the separating device, at least one row in relation to other and in a second direction perpendicular to the first; inserting separating plate means between the separated rows; and maintaining said plate means between said two rows as the rows are subsequently removed from said separating device.

According to a preferred embodiment of the above method, the two rows are separated transversely by raising the top row off the bottom row, preferably by sucking the top row on to a suction element traveling in said second direction.

The above method preferably also comprises a further stage wherein said rows, still contacting each other, are moved, transversely in relation to said longitudinal axes and in a third direction perpendicular to said first and second directions, between an input station and a separating station of the separating device; the two rows being separated transversely at the separating station; and the separated rows being removed as of the separating station.

Finally, the two separated rows are preferably removed from said separating device by simultaneously feeding the separated rows in a fourth direction parallel to said first direction.

BRIEF DESCRIPTION OF THE DRAWINGS

A non-limiting embodiment of the present invention will be described by way of example with reference to the accompanying drawings, in which:

FIGS. 4 and 5 show sections, as in FIG. 3, of the FIG. 3 device in two successive operating positions.

DETAILED DESCRIPTION OF THE INVENTION

Number 1 in the accompanying drawings indicates a separating device for receiving a succession of groups 2 of cigarette packets 3 arranged in two substantially horizontal, mutually contacting rows 4 and 5. Device 1 provides for separating the top row 4 from the bottom row 5, and for feeding rows 4 and 5 so separated to a user station described later on.

Figure 1:
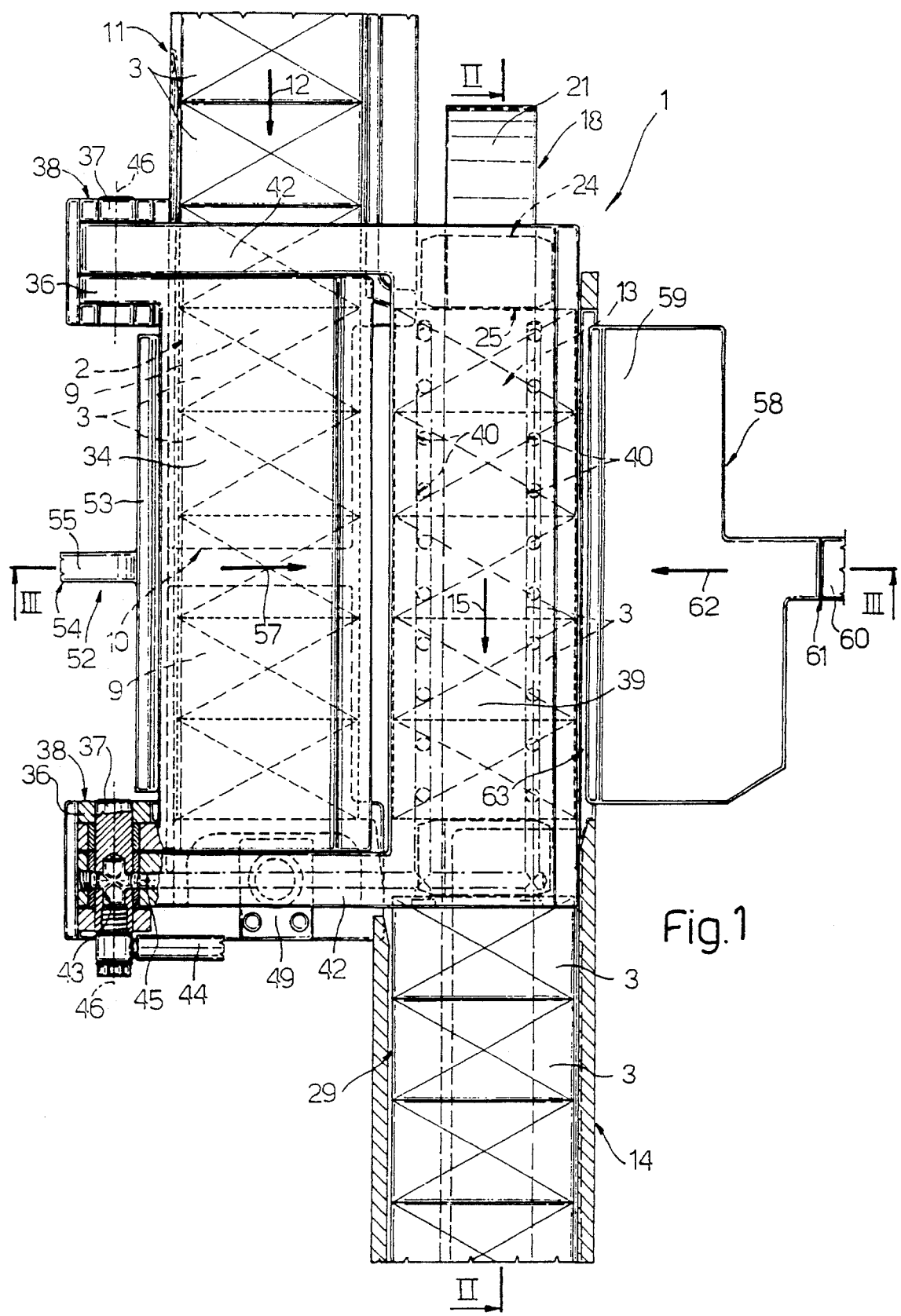
FIG. 1 shows a top plan view of a preferred embodiment of the device implementing the method according to the present invention.
Figure 3:
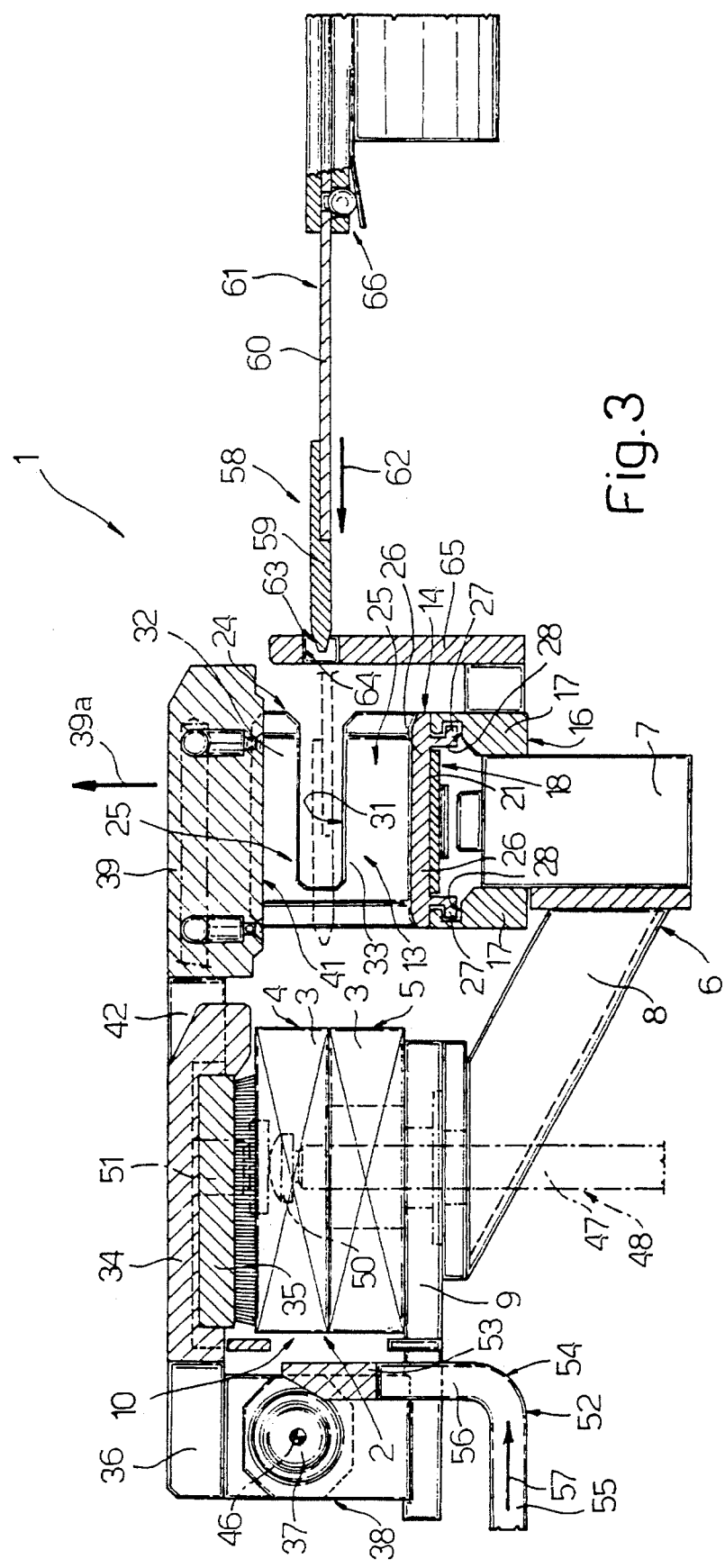
FIG. 3 shows a larger-scale section along line III—III in FIG. 1.

As shown in FIGS. 1 and 3, device 1 comprises a supporting frame 6 in turn comprising a pair of uprights 7, each having a respective projecting arm 8 supporting a respective substantially rectangular, horizontal plate 9 facing and aligned with the other plate 9 so as to define an input station 10 for receiving a group 2 fed into station 10 by an input conveyor 11. Conveyor 11 presents a transportation surface coplanar with plates 9, and provides for feeding a succession of groups 2 to station 10 in a direction 12 aligned with plates 9 and with rows 4 and 5 and perpendicular to the longer longitudinal axis of packets 3 in rows 4 and 5.

Figure 2:
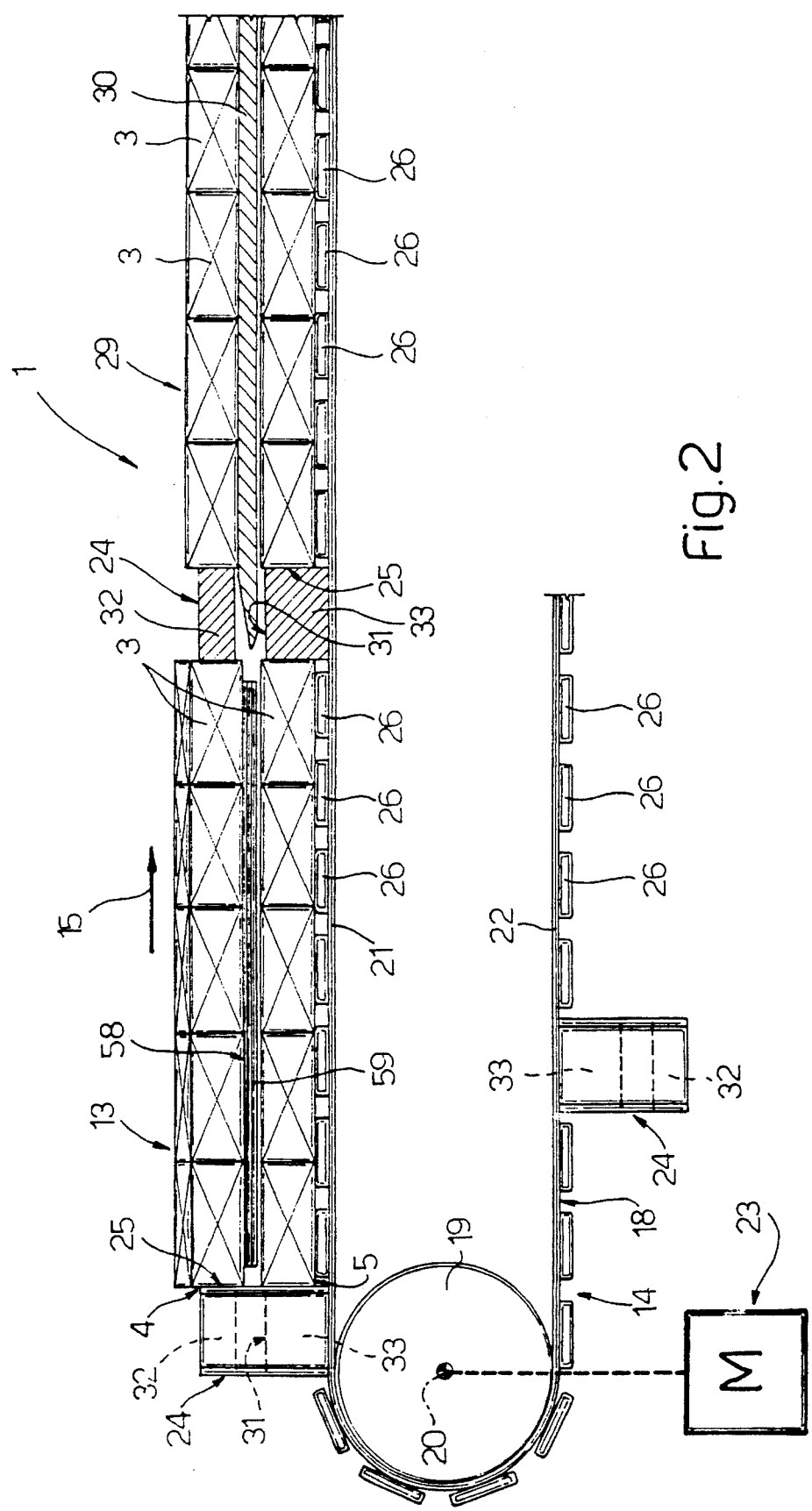
FIG. 2 shows a section along line II—II in FIG. 1, with parts removed for simplicity.

With reference to FIGS. 1, 2 and 3, device 1 also comprises a separating station 13 adjacent to and located to the side of station 10 and parallel to conveyor 11. Station 13 is defined by an initial portion of an output conveyor 14 extending in direction 15 parallel to direction 12, and comprising a supporting frame 16 defined by two lateral shoulders 17 integral with an end portion of uprights 7. Conveyor 14 also comprises a belt 18 looped about two guide rollers 19 (only one shown) connected to frame 16 so as to rotate about respective axes 20 perpendicular to directions 12 and 15, and which divide belt 18 into a delivery branch 21 extending between shoulders 17 and through station 13, and into a return branch 22.

Belt 18 is step operated by a motor 23 connected to one of rollers 19, and presents a number of dividing elements 24 defining a succession of pockets 25 for housing and transporting respective groups 2, and a number of plates 26, each designed to support a respective packet 3 in bottom row 5 of a respective group 2. Each plate 26 is connected to the outer surface of belt 18, and presents, on the side connected to belt 18, two guide appendixes 27 engaging in sliding manner respective longitudinal grooves 28 formed along shoulders 17.

Downstream from station 13 in direction 15, conveyor 14 presents an output portion defining the user station 29 mentioned previously, and wherein a plate 30, arranged facing delivery branch 21 of belt 18 and separated from the same by a distance approximately equal to but no less than the thickness of packet 3, defines a transportation surface for top row 4 of each group 2, the bottom row 5 of which remains on branch 21. Rows 4 are fed along plate 30 by elements 24, each of which presents a central opening 31 dividing element 24 into a top pusher 32, for feeding a respective row 4 along plate 30, and a bottom pusher 33 contacting one end of a respective row 5 on branch 21 of belt 18.

Input station 10 is defined at the top by a substantially rectangular plate 34 facing plates 9 and the longitudinal axis of which is aligned with direction 12. Plate 34 presents, at the bottom, a brush 35 for exerting a given retaining pressure on groups 2 entering station 10, and, at its opposite longitudinal ends, presents two transverse arms 36, the free ends of which are hinged, by means of respective pins 37 parallel to direction 12, to respective forks 38 extending upwards from plates 9.

Station 13 is defined at the top by a substantially rectangular plate 39 facing branch 21 of belt 18 and the longitudinal axis of which is aligned with direction 15. Plate 39 presents suction conduits 40 terminating at bottom surface 41 of plate 39, and, at its opposite longitudinal ends, presents two transverse arms 42 extending outwards of respective arms 36 and the free ends of which are hinged to forks 38 by pins 37. Each pin 37 presents a dead axial conduit 43 connected at one end to a suction conduit 44 and at the other end to a conduit 45 extending along respective arm 42 and communicating with conduits 40.

Figure 5:
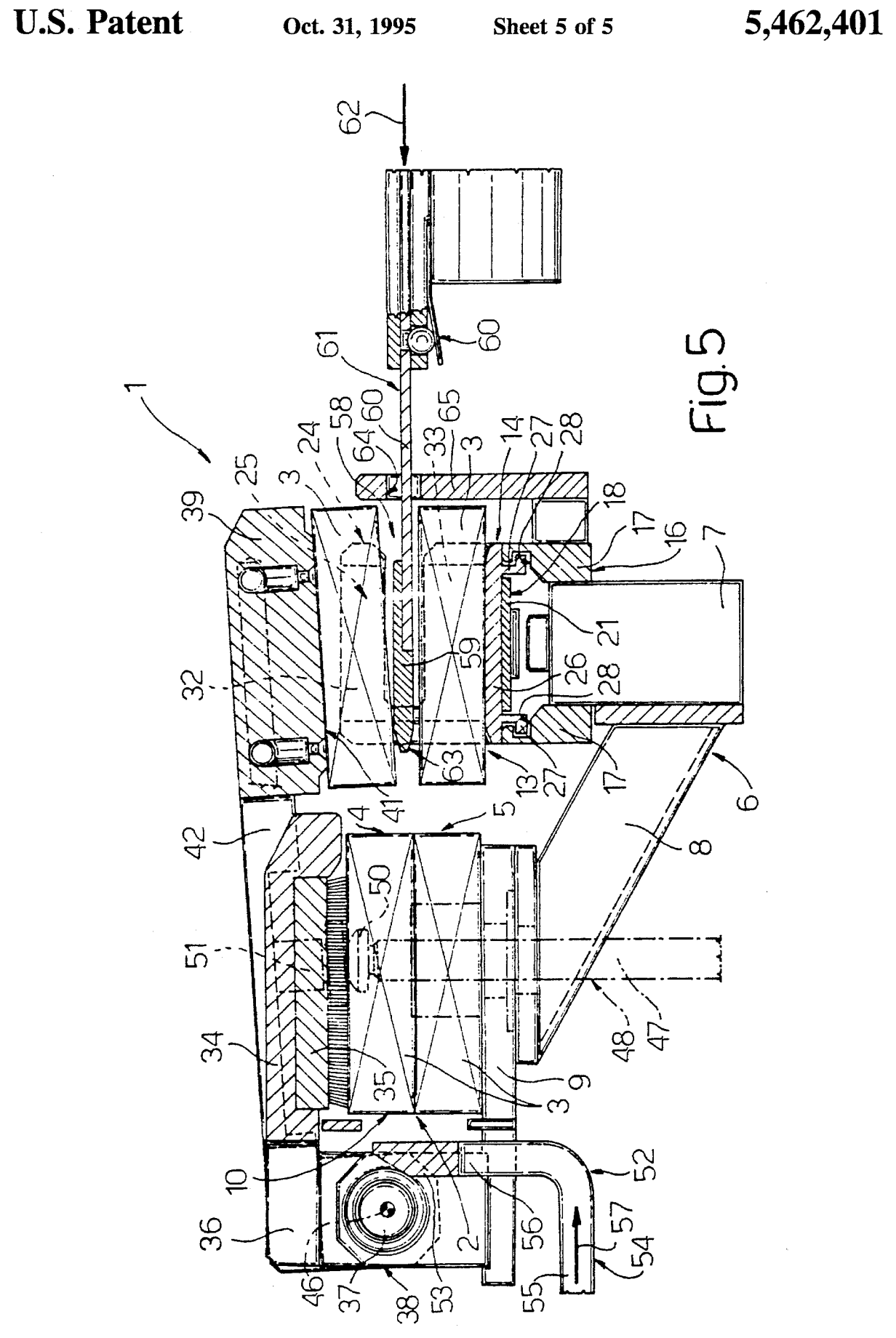

Via the output rod 47 of a linear actuator 48, plate 39 is movable, about axis 46 of pins 37 and in a substantially vertical direction 39a perpendicular to direction 12, between a lowered substantially horizontal position (FIGS. 3 and 4) and a raised position (FIG. 5). Rod 47 is positioned substantially vertically beneath the arm 42 located downstream from station 10 in direction 12, is guided by a bracket on one of plates 9, and presents a head 50 designed to cooperate with a contrasting button 51 connected to the bottom surface of an intermediate portion of said arm 42.

Device 1 also comprises a pusher 52 in turn comprising a push plate 53 extending between plates 9 and plate 34, perpendicular to plates 9, and parallel to direction 12. Pusher 52 also comprises a linear actuator 54, the output rod 55 of which is located beneath plates 9, and presents a vertical end portion 56 connected to an intermediate point of plate 53. Portion 56 is movable between plates 9 and in a direction 57 perpendicular to directions 12 and 15, so as to feed group 2 from station 10 to station 13 and into a respective pocket 25 on branch 21 of belt 18.

Finally, device 1 comprises a sword-shaped element 58 facing pusher 52 and comprising a substantially rectangular plate 59, the longitudinal axis of which is parallel to direction 15, and the mid point of a first longitudinal edge of which is fitted with the free end of rod 60 of a linear actuator 61. Actuator 61 provides for moving plate 59 in direction 62 parallel to direction 57, and between an extracted position (FIGS. 3 and 4) wherein plate 59 is positioned clear of station 13 and presents a second wedge-shaped longitudinal edge 63 engaging an opening 64 formed through lateral wall 65 of station 13, and a forward position (FIG. 5) wherein plate 59 is positioned inside station 13, over branch 21 of belt 18 and coplanar with plate 30.

Figure 4:
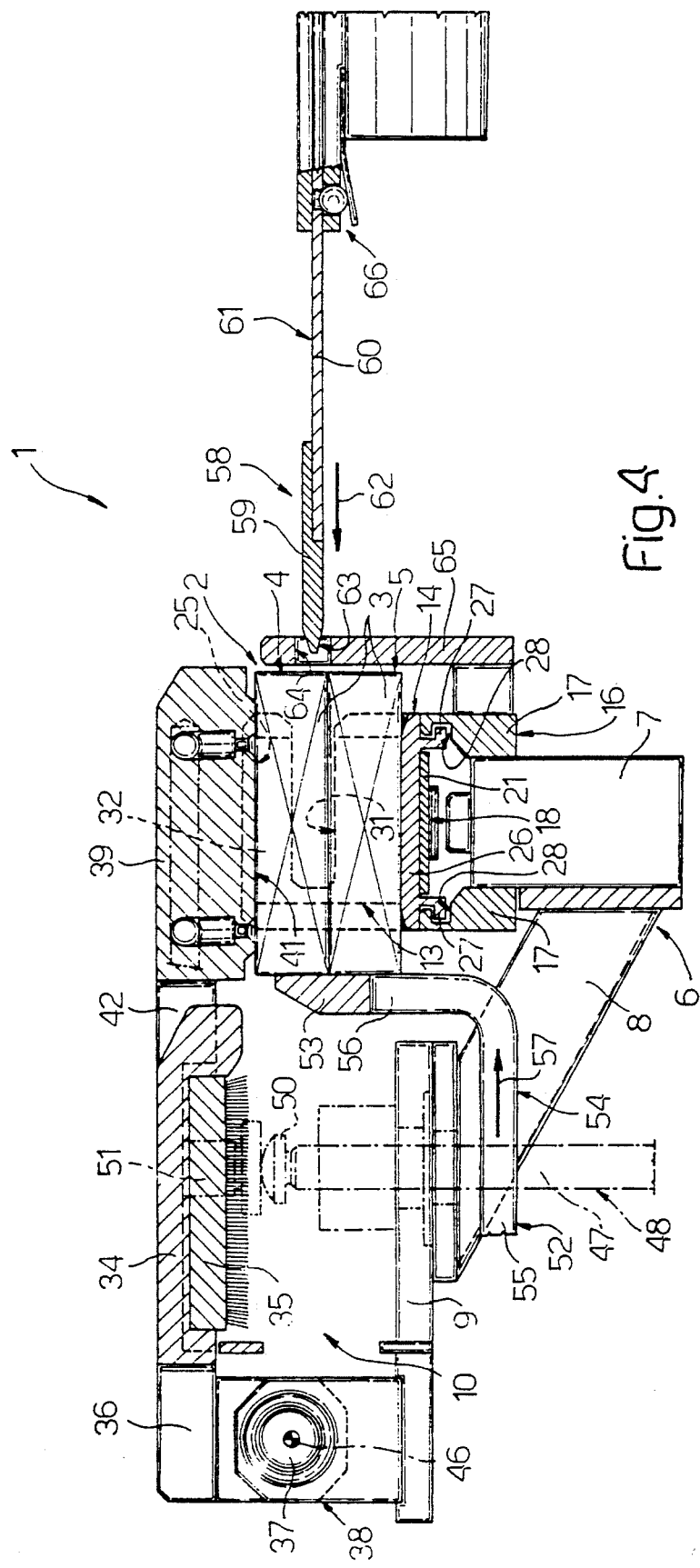

As shown in FIG. 4, a spherical lock device 66 cooperates with rod 60 for selectively locking it in said two extracted and forward positions.

Operation of device 1 will now be described as of the FIG. 3 condition wherein pusher 52 is withdrawn clear of station 10; a group 2 of packets 3 is supported on plates 9 and interacts with brush 35; element 58 is set to the extracted position; plate 39 of station 13 is set to the lowered position; and conveyor 14 is stationary with a pocket 25 in station 13 and facing group 2 in station 10.

As of the above condition, pusher 52 is moved through station 10 and towards conveyor 14, so as to transfer group 2 (FIG. 4) from station 10 to station 13 and into respective pocket 25 between branch 21 of belt 18 and surface 41 of plate 39; air is withdrawn along conduits 40 so as to suck packets 3 in row 4 on to plate 39; and, by means of actuator 48, plate 39 is raised (FIG. 5) so as to raise packets 3 in row 4 adhering to plate 39 by suction.

Upon packets 3 in row 4 being raised, a gap is formed between rows 4 and 5, which is immediately occupied by plate 59 of element 58 upon actuator 61 being moved from the extracted to the forward position. At this point, the suction along conduits 40 is cut off, so that packets 3 in row 4 drop down on to plate 59, thus enabling respective pusher 32 to feed row 4 of packets 3 on to plate 30, while those in row 5 are fed by belt 18 underneath plate 30.

Simultaneously with the forward movement of plate 59, pusher 52 is restored to its original position clear of station 10, and a further group 2 is fed into station 10 for commencing the next cycle.

We claim:

1. A method of advancing cigarette packets (3) along a feeding path, the method comprising the steps of:

advancing two superimposed rows (4, 5) of cigarette packets (3) along a first portion of said path and in a first direction (12) to a separating device (1), each packet of each of said superimposed rows being in direct contact with a corresponding packet of the other of said superimposed rows, and each said row having a longitudinal axis parallel to said first direction;

transversely separating the two rows (4, 5) by moving, inside the separating device (1), at least one row (4) in relation to other and in a second direction (39a) perpendicular to the first direction so as to completely separate each said packet from said corresponding packet;

inserting plate means (58) between the already separated rows (4, 5), the plate means forming part of the separating device; and removing both said two superimposed and separated rows from said separating device by advancing the two rows along a second portion of said path in a third direction parallel to said plate means, which plate means are maintained in a fixed position between said two rows (4, 5) as the rows (4, 5) are removed from said separating device (1).

2. A method as claimed in claim 1, wherein the two rows (4, 5) are separated transversely by raising the top row (4) off the bottom row (5).

3. A method as claimed in claim 2, wherein said top row (4) is raised off said bottom row (5) by sucking the top row (4) on to a suction element (39) travelling in said second direction (39a).

4. A method as claimed in claim 1, including an intermediate step wherein said rows (4, 5), with each of their respective packets contacting the corresponding packet of the other row, are moved, transversely in relation to said longitudinal axes and in a fourth direction (57) perpendicular to said first (12) and second (39a) directions, between an input station (10) and a separating station (13) of the separating device (1).

5. A method as claimed in claim 4, wherein the two separated rows (4, 5) are removed from said separating device (1) simultaneously.

6. A method as claimed in claim 5, wherein the two separated rows (4, 5) are removed from said separating device (1) by simultaneously feeding the separated rows (4, 5) in a fifth direction (15) parallel to said first direction (12).

7. A method of advancing cigarette packets (3) along a feeding path, the method comprising the steps of:

advancing two superimposed rows (4, 5) of cigarette packets (3) along a first portion of said path and in a first direction (12) to a separating device (1), each packet of each of said superimposed rows being in direct contact with a corresponding packet of the other of said superimposed rows, and each said row having a longitudinal axis parallel to said first direction;

transversely separating the two rows (4, 5) by moving, inside the separating device (1), at least one row (4) in relation to other and in a second direction (39a) perpendicular to the first direction so as to completely separate each said packet from said corresponding packet;

inserting plate means (58) between the already separated rows (4, 5), the plate means forming part of the separating device; and simultaneously removing both said two superimposed and separated rows from said separating device by simultaneously advancing the two rows along a second portion of said path in a third direction parallel to said plate means, which plate means are maintained in a fixed position between said two rows (4, 5) as the rows (4, 5) are simultaneously removed from said separating device (1).

* * * * *